United States Patent
Sugaya et al.

(10) Patent No.: US 6,961,353 B2
(45) Date of Patent: Nov. 1, 2005

(54) RADIO TRANSMISSION METHOD AND RADIO TRANSMISSION APPARATUS

(75) Inventors: Shigeru Sugaya, Kanagawa (JP); Takehiro Sugita, Kanagawa (JP); Yasunori Maeshima, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 09/812,363

(22) Filed: Mar. 20, 2001

(65) Prior Publication Data

US 2001/0036836 A1    Nov. 1, 2001

(30) Foreign Application Priority Data

Mar. 23, 2000 (JP) ............................ P2000-082317

(51) Int. Cl.[7] ................................................. H04J 3/06
(52) U.S. Cl. ...................... 370/503; 370/350; 370/337; 370/338; 370/324; 455/502; 455/450
(58) Field of Search ................................ 370/503, 350, 370/337, 338, 335, 336, 280, 320, 321, 319, 370/322, 324, 326, 347, 348; 455/502, 403, 455/517, 450, 464; 710/25

(56) References Cited

U.S. PATENT DOCUMENTS

| 5,533,027 | A | * | 7/1996 | Akerberg et al. | ............ | 370/347 |
| 5,550,992 | A | * | 8/1996 | Hashimoto | ................... | 370/337 |
| 5,602,852 | A | * | 2/1997 | Shiobara | ...................... | 370/455 |
| 5,754,626 | A | * | 5/1998 | Otonari | ....................... | 370/347 |
| 6,608,824 | B1 | * | 8/2003 | Sugaya | ......................... | 370/337 |

FOREIGN PATENT DOCUMENTS

| EP | 0877512 | | 11/1998 | | |
| EP | 0899920 | | 3/1999 | | |
| EP | 0932277 | | 7/1999 | | |
| EP | 0986214 | | 3/2000 | | |
| EP | 0986214 | A2 | * | 3/2000 | ........... H04L 12/28 |
| WO | 9913600 | | 3/1999 | | |

* cited by examiner

Primary Examiner—Wellington Chin
Assistant Examiner—Chuong Ho
(74) Attorney, Agent, or Firm—Jay H. Maioli (57) ABSTRACT

To provide a radio transmission method and a radio transmission apparatus capable of performing a highly-efficient radio transmission depending on the number of communicating stations, a predetermined frame period is prescribed, a management information transmitting field being provided within the frame period, a station sync transmit/receive interval being provided within the management information transmitting field and an arbitrary communicating station being designated to transmit a station sync at plural frame period intervals during the station sync transmit/receive interval. Thus even if only the station sync transmitting area corresponding to the number which is less than the number of communicating stations forming a network exists within one frame, the station sync can be transmitted and received.

5 Claims, 10 Drawing Sheets

|  | | (A) | (B) | (C) | (D) |
|---|---|---|---|---|---|
| T1 | First Frame Period | #0 | #3 | #7 | #8 |
| T2 | Second Frame Period | #10 | #15 | #18 | #19 |
| T3 | Third Frame Period | #20 | #23 | #28 | #30 |
| T4 | Fourth Frame Period | #36 | #43 | #50 | #54 |

FIG. 11

| 110 | 111 | 112 |
|---|---|---|
| Identifier | Network ID | Transmission Path Use Information |

| 113 | 114 | | 115 |
|---|---|---|---|
| Station Synchronizing Transmission Period | Station Synchronizing Group | | CRC |

FIG. 12

| 120 | 121 | 122 | | 123 |
|---|---|---|---|---|
| Identifier | Communicating Station | Connection Information | | CRC |

RADIO TRANSMISSION METHOD AND RADIO TRANSMISSION APPARATUS

BACKGROUND OF THE INVENTION

1. Field of the Invention

The present invention relates to a radio transmission method and a radio transmission apparatus applicable to, e.g. a case where a plurality of devices form a local area network (LAN) by transmitting information among various kinds of transmission apparatus by a radio signal.

2. Description of the Related Art

From the past have been proposed various kinds of radio transmission method in which the number of communicating stations forming a radio network is selected to be an arbitrary integer equal to or greater than two, a frame structure common to the radio network being used, a management information transmitting field being provided in a part of the frame and information necessary for managing the network being transmitted and received in the management information transmitting field.

As a first conventional radio transmission method, according to an official gazette of Japanese laid-open patent application No. H11-251992, there is proposed a method in which areas for transmitting station synchronizing signals from all communicating stations forming a network are provided within a predetermined frame period so as to avoid conflict with each other.

As a second conventional radio transmission method, there is conceived a method in which, in that management information transmitting field within a predetermined frame period, a station synchronizing signal transmitting interval during which one communicating station can issue a transmission request is provided and a communicating station having a transmission request, etc. starts transmission in this area as the need arises.

Further, as a third conventional radio transmission method, according to an official gazette of Japanese laid-open patent application No. H11-374728, there is proposed a method in which, in that management information transmitting field, an interval for transmitting station synchronizing information necessary for managing a network can be varied depending on a change in the number of the communicating stations forming the network.

Alternatively, as a fourth conventional radio transmission method, there is conceived a method in which a station synchronizing signal transmission and reception interval during which one communicating station transmits is provided within a predetermined frame period and a communicating station designated by a control station transmits a station synchronizing signal in every frame period.

However, according to the first conventional radio transmission method, there is a disadvantage that, since there are provided in each communicating station the station synchronizing signal transmitting areas of the number corresponding to the number of assumed communicating stations as fixed areas in every frame which arrives periodically, if there are a few communicating stations forming the network, then many useless areas will exist.

According to the second conventional radio transmission method, there is a disadvantage that, when a plurality of communicating stations issue transmission requests at the same time, transmitted signals conflict with each other and so this conventional radio transmission method cannot be applied to a radio transmission in which it is difficult to detect a conflict by simultaneously performing transmission and reception.

According to the third conventional radio transmission method, there is a disadvantage that, because the station synchronizing signal transmitting area increases as the number of the communicating stations forming the network increases, it tends to be difficult to satisfactorily transmit information in the information transmitting field of the latter half of the frame.

According to the fourth conventional radio transmission method, there is a disadvantage that information contained in the station synchronizing signals from all the communicating stations cannot be obtained unless the frame periods corresponding to the number of the communicating stations in operation pass until the transmission of the station synchronizing signals from all the communicating stations forming the network finishes.

Also, according to the fourth conventional radio transmission method, there is a disadvantage that, when the communicating station which is requested to transmit information in the frame period fails to receive down-link control information designating the transmission, the station synchronizing signal from that communicating station cannot be transmitted.

SUMMARY OF THE INVENTION

Accordingly, the present invention is made in view of the aforesaid points and aims to provide a radio transmission method and a radio transmission apparatus capable of a highly-efficient radio transmission depending on the number of communicating stations.

While there has heretofore been assumed such an arrangement that a predetermined frame period is prescribed and a down-link control interval and a station synchronizing transmission and reception interval are always provided within the frame period according to the prior art, a radio transmission method and a radio transmission apparatus according to the present invention are arranged so that one transmitting area of a station synchronizing signal transmission and reception interval (hereinafter simplified as "station sync transmit/receive interval) is provided in every several frames for each communicating station so as to prevent the information transmitting field from being occupied due to an increase of the communicating stations forming the network.

Thus, even if there exist only the station synchronizing signal transmitting areas the number of which is less than the number of the communicating stations forming the network within one frame, by specifying an arbitrary communicating station to transmit the station synchronizing signal at intervals of a plurality of frame periods, the station synchronizing signal (hereinafter simplified as "station sync") can be transmitted and received satisfactorily.

Moreover, the present invention is arranged so that, by providing the station sync transmit/receive interval during which a plurality of communicating stations can transmit in the frame period, station synchronizing information from all the communicating stations can be obtained before the number of the frames corresponding to the number of the communicating stations in operation passes.

Furthermore, the present invention is arranged so that, when there are a few communicating stations forming the network, the station sync transmit/receive intervals of all the communicating stations can be provided in each short frame period depending on the number of the communicating stations.

Thus, even if there are a few communicating stations forming the network, useless station sync transmitting areas can be reduced. Besides, even if the number of the communicating stations forming the network increases, information on the station sync can be transmitted satisfactorily and further information of all communicating stations can be obtained in a short period of time.

Moreover, the present invention is arranged so that, in order that the communicating station transmits the station synchronizing information in a cycle of a plurality of frames, instructions on which communicating station transmits information is transmitted in advance a plurality of frame periods back from the radio transmission apparatus serving as a control station to the network using down-link control information.

Thus, by determining in advance which communicating station transmits the station sync in which frame period and then transmitting such information as the down-link control information several frames before, even if immediately-preceding down-link control information is missed, a transmitting station of a station sync in the frame period can be specified.

Furthermore, the present invention is arranged so that, for the purpose of specifying the station sync transmit/receive interval to be transmitted by its own station depending on the number of the communicating stations forming the network, station sync transmitting frame period information and station sync transmitting group information are utilized to identify that interval.

Thus, by specifying information on transmitting the station sync by the frame periods in the down-link control information and designating the group for transmitting the current station sync, it is possible to specify a communicating station which transmits a station sync (synchronizing signal) of and after the next frame.

BRIEF DESCRIPTION OF THE DRAWINGS

FIG. 10 is a diagram showing an example of a layout of a station synchronizing interval required when there are an arbitrary number of communicating stations of;

DESCRIPTION OF THE PREFERRED EMBODIMENTS

A radio transmission method according to an embodiment of the present invention is such that, when transmitting information in a network system, a down-link control interval and a station sync transmit/receive interval are provided within a transmission frame defined in every substantially fixed period and the transmission period of the station sync can be varied depending on the number of the communicating stations forming the network. The present invention is also applied to radio transmission apparatus comprising a control station which controls transmission and reception of this station sync, and terminal stations.

Figure 1:
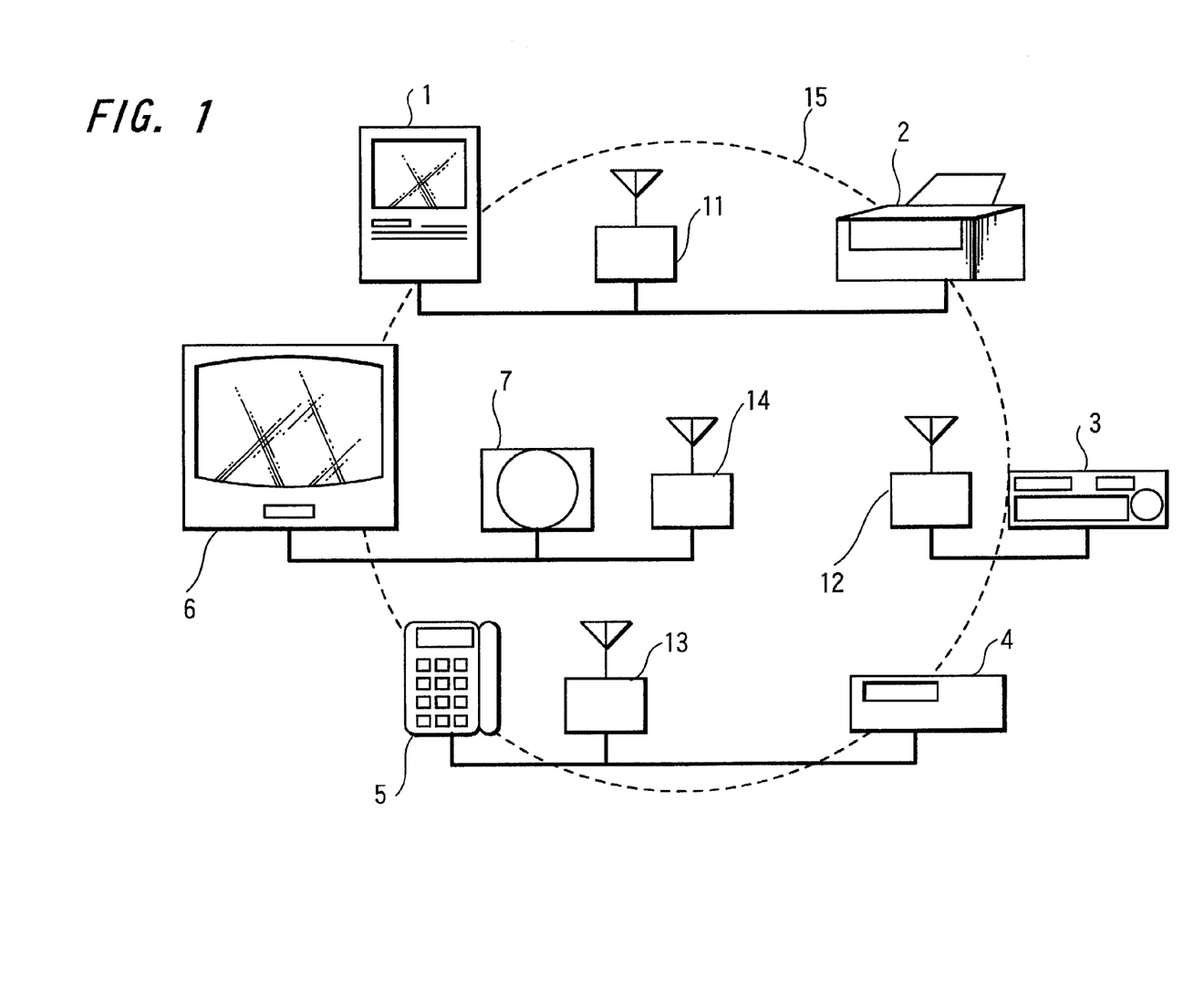
FIG. 1 is a diagram showing an example of the structure of a radio network to which a radio transmission method according to the embodiment of the present invention is applied.

An embodiment according to the present invention will be described below. FIG. 1 is a diagram showing an example of the structure of a network system to which a radio transmission method according to the embodiment of the present invention is applied.

As shown in FIG. 1, for example, a personal computer 1 and a printer device 2 are connected to a radio transmission apparatus 11 by wire such as a cable. Similarly, a VTR (video tape recorder) 3 is connected to a radio transmission apparatus 12 by wire such as a cable. Similarly, a telephone set 5 and a set top box 4 are connected to a radio transmission apparatus 13 by wire such as a cable. Likewise, a television receiver 6 and a game device 7 are connected to a radio transmission apparatus 14 by wire such as a cable. In this manner, the respective devices are connected to the respective radio transmission apparatus, and the respective radio transmission apparatus form a network 15.

Figure 2:
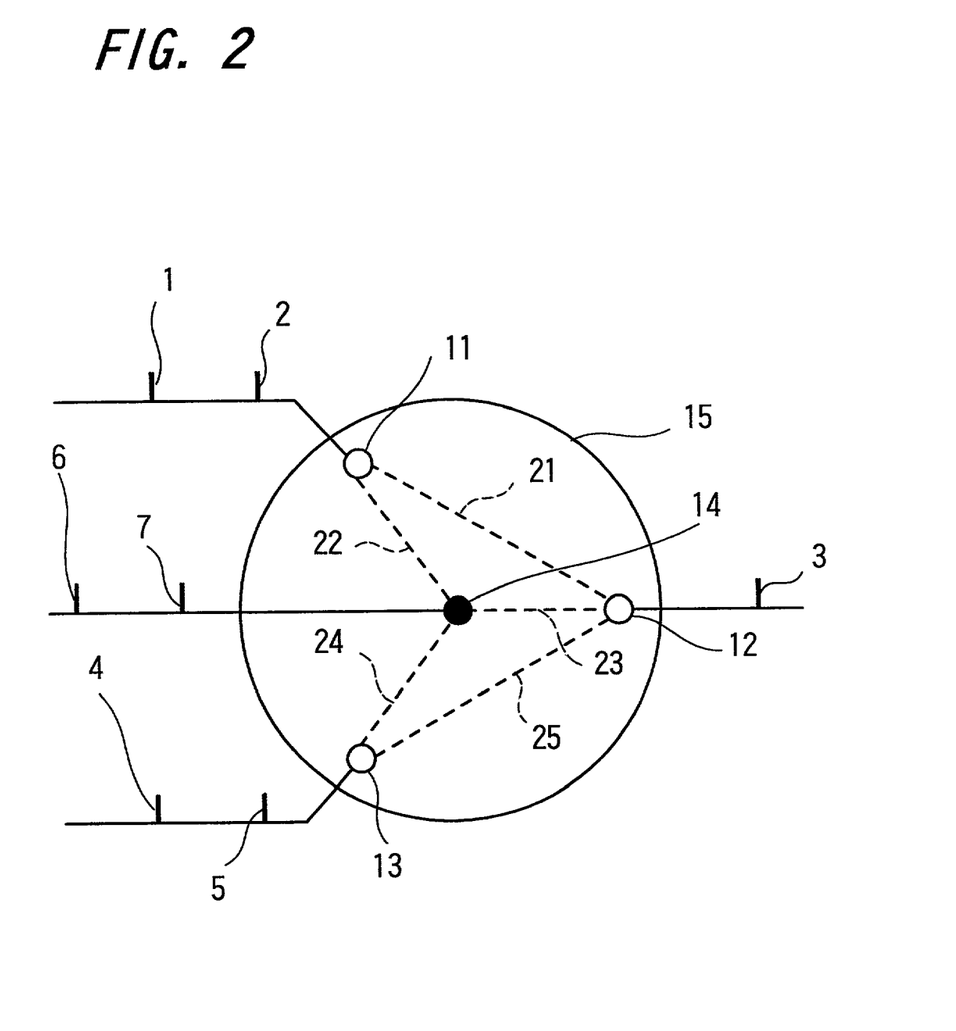
FIG. 2 is a diagram schematically showing a mode of the network connection.

FIG. 2 is a diagram schematically showing a mode of connection of the network.

In FIG. 2, the radio network 15 comprising the radio transmission apparatus 11, 12, 13 of the terminal communicating stations shown by blank circles is formed around the radio transmission apparatus 14 of the control station shown by a solid circle. The personal computer 1 and the printer device 2 are connected to the radio transmission apparatus 11 as shown by a solid line. The VTR 3 is connected to the radio transmission apparatus 12 also as shown by a solid line. The telephone set 5 and the set top box 4 are connected to the radio transmission apparatus 13 also as shown by a solid line. The television receiver 6 and the game device 7 are connected to the radio transmission apparatus 14 also as shown by a solid line.

In FIG. 2, it is shown that within the radio network 15, the control station 14 is able to communicate with all communicating stations 11 to 13 on the network 15 through channels 22 to 24 shown by dotted lines.

In contrast, the communicating station 11 is unable to directly transmit information to the communication station 13 located far away, but it is able to communicate with the control station 14 and the communicating station 12 on the network 15 through channels 22, 21 shown by dotted lines.

Also, the communicating station 12 is able to communicate with the control station 14 and the communicating stations 11, 13 on the network 15 through channels 23, 21, 25 shown by dotted lines.

Further, although the communicating station 13 is unable to directly transmit information to the communicating station 11 located far away, it is able to communicate with the control station 14 and the communicating station 12 on the network 15 through channels 24, 25 shown by dotted lines.

Figure 3:
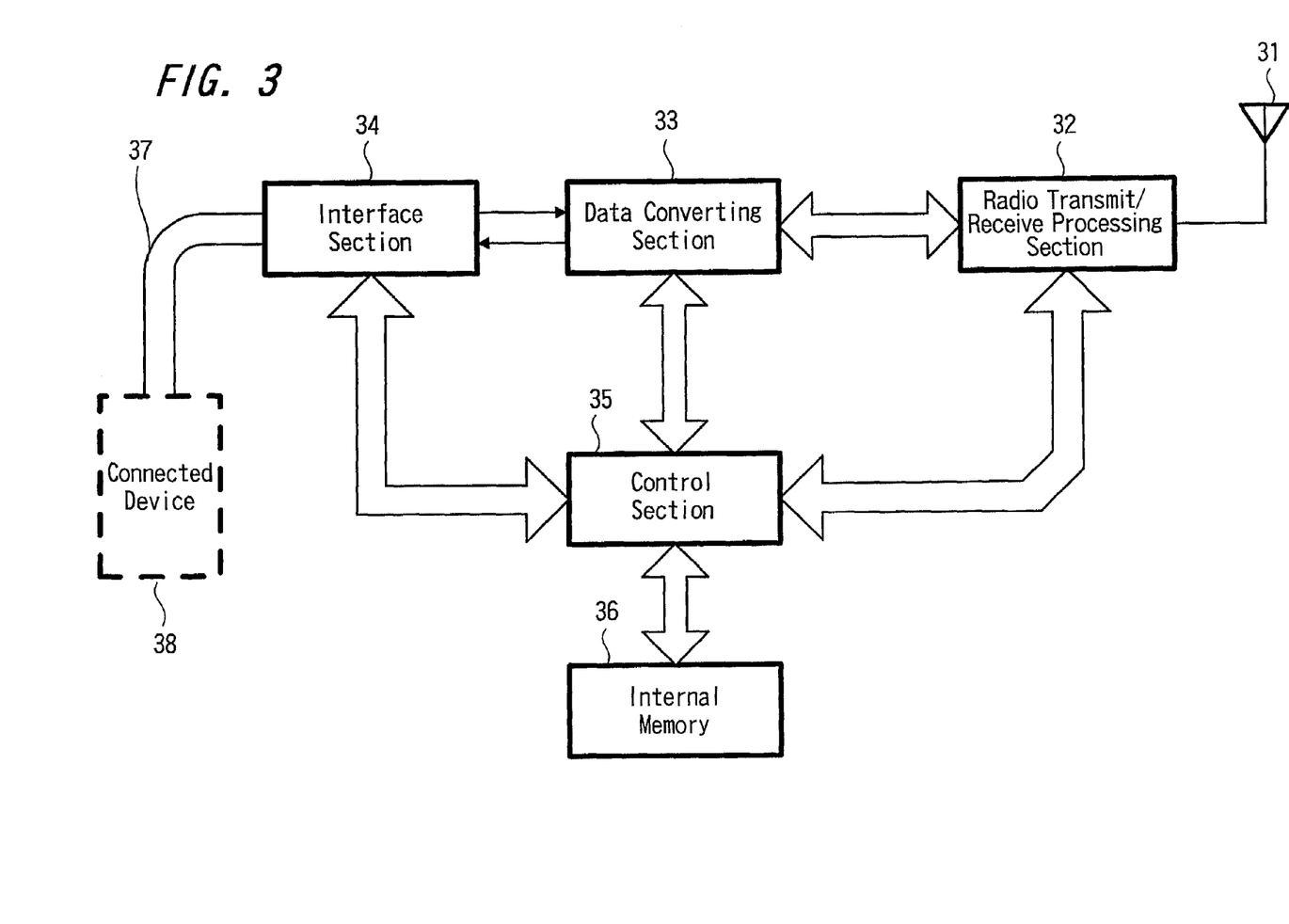
FIG. 3 is a diagram showing an example of the structure of a radio transmission apparatus forming each communicating station.

FIG. 3 shows an example of the structure of the radio transmission apparatus 11 to 14 forming the respective communicating stations.

In FIG. 3, each of the radio transmission apparatus 11 to 14 has fundamentally a common structure and includes an antenna 31 through which information is transmitted and received as well as a radio transmission and reception processing section 32 (hereinafter simplified as "radio transmit/receive processing section") connected to this antenna 31 to carry out radio transmission processing and radio reception processing, whereby it is possible to transmit information with other transmission apparatus by radio.

In this case, as a transmission method for the radio transmit/receive processing section 32 in this embodiment to transmit and receive a radio signal, for example, a transmission method using a multicarrier signal, called an OFDM (Orthogonal Frequency Division Multiplex) method is used. As a frequency used in transmission and reception, for example, a very high frequency band (e.g., 5 GHz band) is employed.

In case of this embodiment, a transmission output is set at a relatively low output. When the radio transmission apparatus is used, e.g. the transmission output is set at such a level that a radio transmission of a relatively short distance ranging from several meters to several 10s meters can be carried out.

This radio transmit/receive processing section 32 has the structure which enables the communicating stations which had reserved the band in advance to communicate with each other during the band reserved transmission area, and also has the structure capable of transmitting and receiving information under the predetermined transmission control of the control station during an asynchronous information transmitting area. Thus, these communicating stations communicate with each other during the respective areas based on instructions from the control section 35.

The radio transmission apparatus includes a data converting section 33 for converting data on an information signal of signals received by the radio transmit/receive processing section 32 and for converting data on an information signal which is transmitted from the radio transmit/receive processing section 32.

Further, in this radio transmission apparatus, data converted by the data converting section 33 is supplied through an interface section 34 to a connected device 38. Data supplied from the connected device 38 is supplied through the interface section 34 to the data converting section 33 where it can be converted.

In this embodiment, through an external interface of the interface section 34 in the radio transmission apparatus, for example, through a high-speed bus 37 like an IEEE 1394 format serial bus, communication of audio and video information or a variety of data information can be performed with the connected device 38.

Alternatively, the connected device 38 may incorporate these radio transmission apparatus within its body.

Each section within the radio transmission apparatus is arranged to execute processing under the control of the control section 35 comprised of a microcomputer or the like.

In this case, when a signal received by the radio transmit/receive processing section 32 is a control signal such as down-link control information or station synchronizing information, the received signal is supplied through the data converting section 33 to the control section 35 so that the control section 35 may set each section into the state indicated by the received control signal.

Further, the control section 35 has an internal memory 36 connected thereto. The internal memory 36 is adapted to temporarily store therein data necessary for controlling communications, the number of the communicating stations forming the network, information on the frame period during which the station sync is transmitted, information on a communicating station which transmits a station sync in a predetermined frame period, information on how to utilize a transmission path and the like.

The radio transmission apparatus 14 which serves as the control station of the network has such a structure that a sync (synchronizing signal) of the network is supplied from the control section 35 through the data converting section 33 to the radio transmit/receive processing section 32 in a predetermined frame period and then it is transmitted by radio.

In the control section 35 of the radio transmission apparatus 11 to 13 other than the control station of the network, when the received signal is the sync, the received signal is supplied through the data converting section 33 to the control section. Then, the control section 35 decides a timing when it receives the sync, sets a frame period based on the sync, and executes communication control processing in the thus set frame period.

Figure 4:
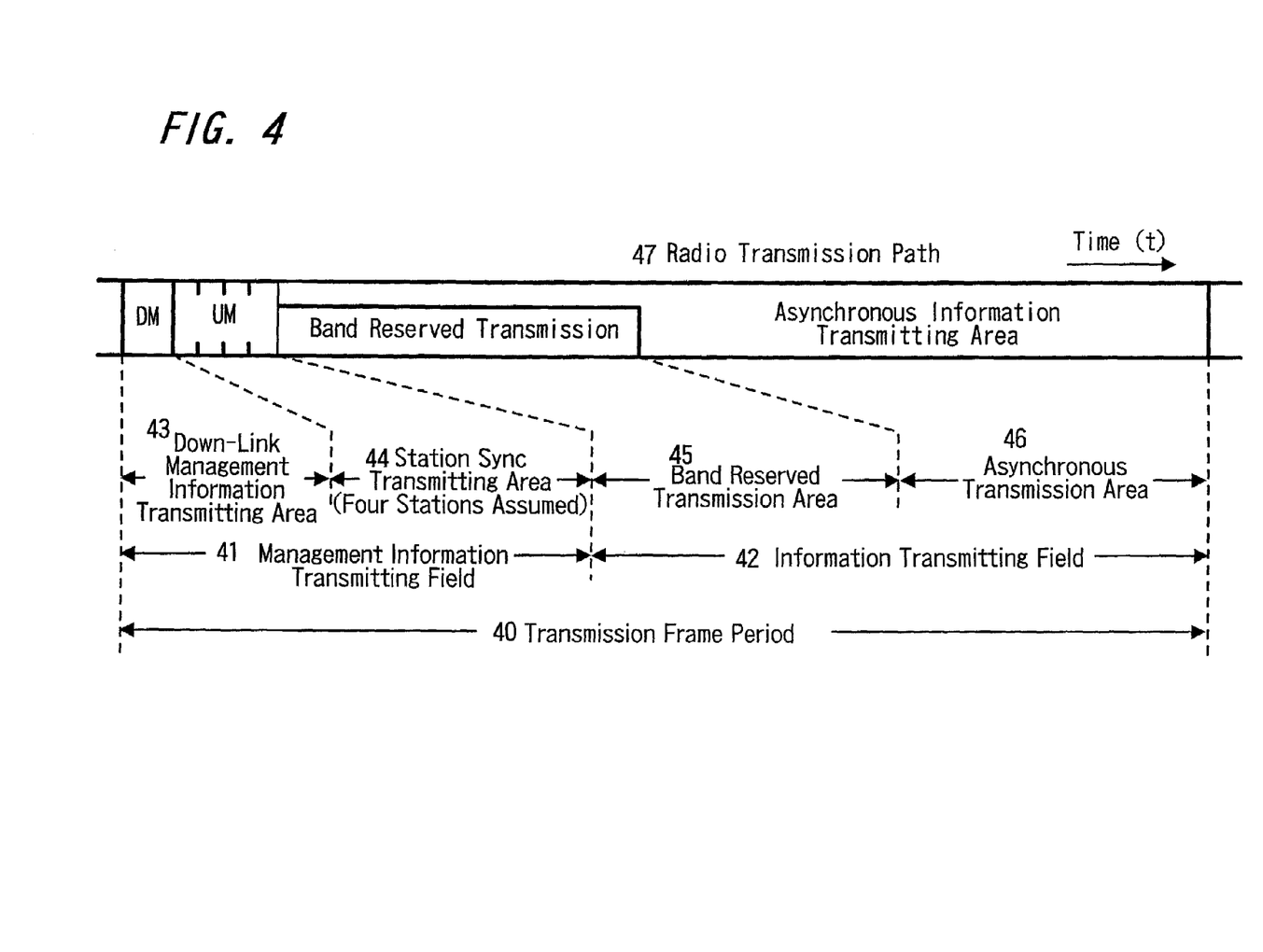
FIG. 4 is a diagram showing an example of the structure of a radio transmission frame.

FIG. 4 is a diagram showing an example of the structure of a radio transmission frame.

While the frame is defined for convenience in this diagram, such a frame structure need not always be adopted. As shown in this diagram, there is defined a transmission frame period 40 which arrives in a fixed cycle. In this transmission frame period, there are provided a management information transmitting field 41 and an information transmitting field 42.

A down-link control information transmitting interval (DM: Down link Management) 43 for communicating a frame synchronization and network common information is arranged at the head of this frame. A station sync transmitting interval (UM: Up Link Management) 44 is arranged following the down-link control information transmitting interval.

This station sync transmitting interval (UM) 44 has a predetermined length (This interval is prepared herein as a four station length) and has such a structure that a communicating station to transmit is allocated by down-link management control information for each communicating station forming the network.

For example, it is possible to grasp a connection link state with communicating stations existing around his own station by receiving all information other than transmitting portions of his own station within this station synchronizing interval.

Further, the respective communicating stations are able to grasp the connection status of the network by reporting to each other the status of this connection link in the next information transmitted by his own station during the station synchronizing interval.

Moreover, the information transmitting field 42 is comprised of a band reserved transmission area 45 which is to be set as the need arises and an asynchronous transmission area 46 in the remaining portion.

In other words, if the band reserved transmission is not necessary, then the whole of the information transmitting field 42 can be used as the asynchronous transmission area 46 in transmission.

With the above frame structure, for example, an isochronous transmission which is defined by the IEEE 1394 format, can be carried out in the band reserved transmission area 45 and an asynchronous transmission can be carried out in the asynchronous transmission area 46. This may be a preferable structure.

Figure 5:
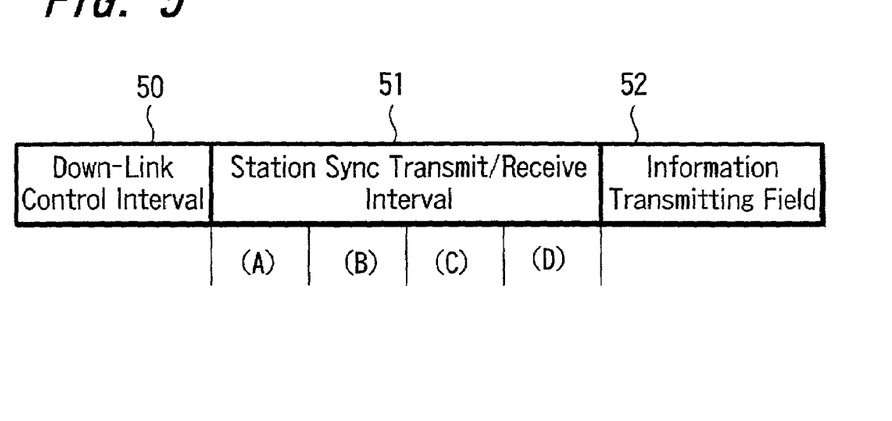
FIG. 5 is a diagram showing an example of a layout of a station synchronizing interval.

FIG. 5 is a diagram for explaining details of the station synchronizing interval.

As illustrated, in one frame period, a down-link control interval 50 is followed by a station sync transmit/receive interval 51 during which four communicating stations (A), (B), (C) and (D) are able to transmit each sync. This station sync transmit/receive interval is followed by the information transmitting field 52.

While a case where the four communicating stations are able to transmit the sync is described above, the present invention is not limited to the above number of the communicating stations, and may be arranged in a manner that the station sync transmit/receive interval 51 corresponding to the arbitrary number of the communicating stations other than four communicating stations is prepared as an assumed radio network demands.

In this embodiment, a radio transmission method will be described, in which this station sync transmit/receive interval 51 is utilized by a plurality of communicating stations.

FIGS. 6 to 10 show examples of structures of station sync transmit/receive intervals used for a plurality of communicating stations.

Figure 6:
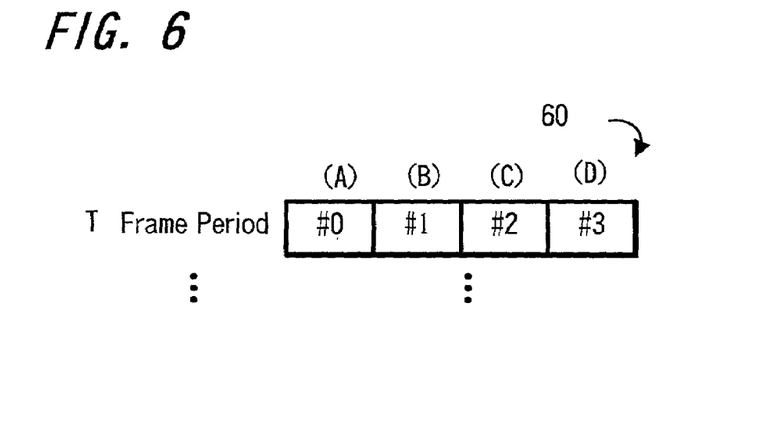
FIG. 6 is a diagram showing an example of a layout of a station synchronizing interval required when there are four communicating stations.

FIG. 6 shows an example of the structure when the station sync transmit/receive interval 51 shown in FIG. 5 is used by up to four communicating stations.

It is herein shown that a communicating station (#0) to a communicating station (#3) utilize the same station sync transmit/receive interval in each frame period T for transmission of transmitting station information 60 of the station synchronizing interval as information of each communicating station.

Figure 7:
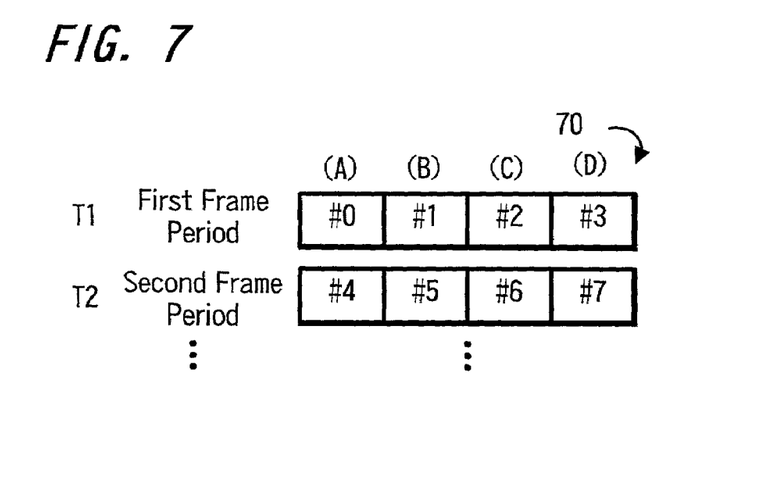
FIG. 7 is a diagram showing an example of a layout of a station synchronizing interval required when there are eight communicating stations.

FIG. 7 shows an example of the structure when the station sync transmit/receive interval 51 shown in FIG. 5 is utilized by up to eight communicating stations.

It is herein shown that the station sync transmit/receive intervals for the communicating station (#0) to the communicating station (#3) are set as a first frame period Ti, the station sync transmit/receive intervals for communicating stations (#4) to (#7) being set as a second frame period T2, and thus transmitting station information 70 of the station synchronizing interval being transmitted sequentially and alternately at every other frame using these intervals as information of each communicating station.

Figure 8:
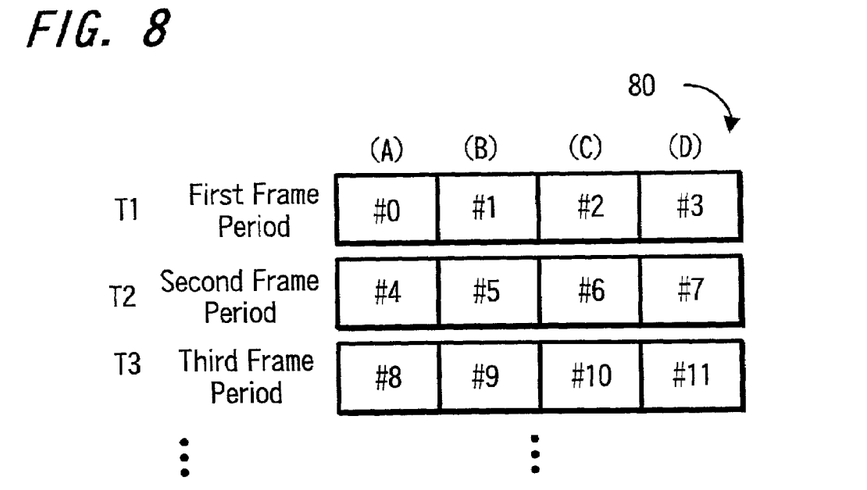
FIG. 8 is a diagram showing an example of a layout of a station synchronizing interval required when there are twelve communicating stations.

FIG. 8 shows an example of the structure when the station sync transmit/receive interval 51 shown in FIG. 5 is utilized by up to twelve communicating stations.

It is herein shown that the station sync transmit/receive intervals for the communicating station (#0) to the communicating station (#3) are set as a first frame period T1, station sync transmit/receive intervals for a communicating station (#4) to a communicating station (#7) being set as a second frame period T2, station sync transmit/receive intervals for a communicating station (#8) to a communicating station (#11) being set as a third frame period T3, and thus transmitting station information 80 of the station synchronizing interval being transmitted sequentially in every third frame as information of each communicating station using these intervals.

Figure 9:
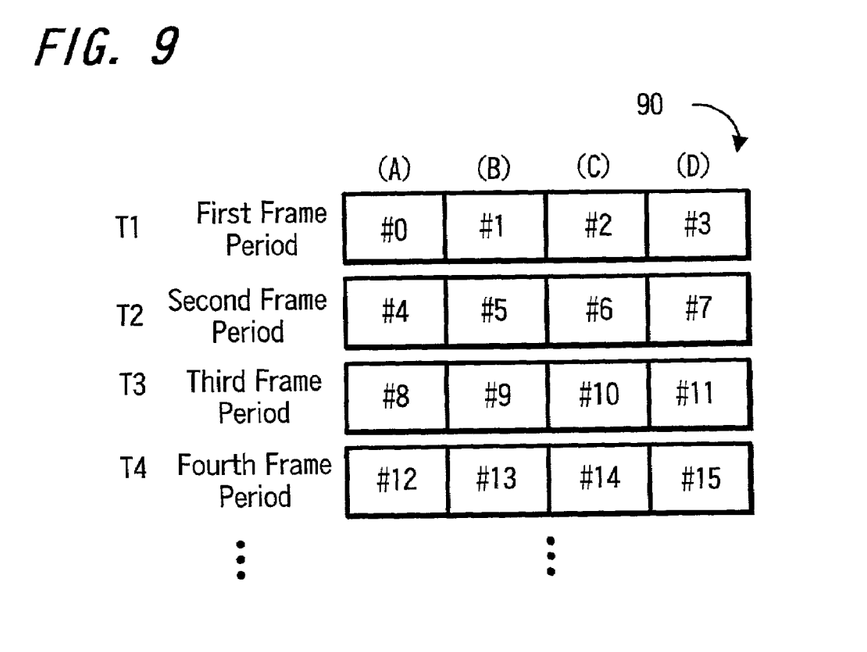
FIG. 9 is a diagram showing an example of a layout of a station synchronizing interval required when there are sixteen communicating stations.

FIG. 9 shows an example of the structure when the station sync transmit/receive interval 51 shown in FIG. 5 is utilized by up to sixteen communication stations.

It is herein shown that the station sync transmit/receive intervals for the communicating station (#0) to the communicating station (#3) are set as a first frame period T1, the station sync transmit/receive intervals for the communicating station (#4) to the communicating station (#7) being set as a second frame period T2, the station sync transmit/receive intervals for the communicating station (#8) to the communicating station (#11) being set as a third frame period T3, station sync transmit/receive intervals for a communicating station (#12) to a communicating station (#15) being set as a fourth frame period T3, and thus transmitting station information 90 of the station synchronizing interval being transmitted sequentially in every fourth frame as information of each communicating station using these intervals.

Figure 10:
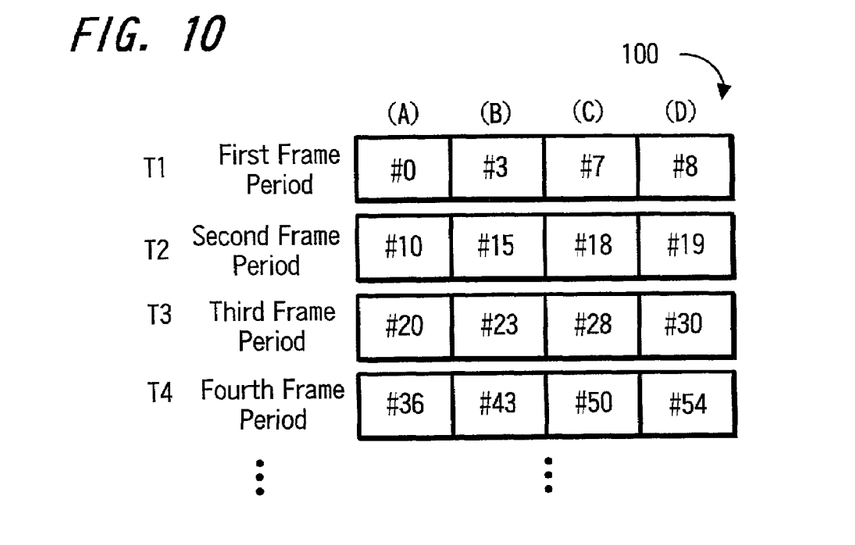

FIG. 10 shows an example of the structure when the station sync transmit/receive interval 51 shown in FIG. 5 is utilized by more communicating stations arranged at arbitrary positions.

It is herein shown that the station sync transmit/receive intervals for the communicating station (#0), the communicating station (#3), the communicating station (#7) and the communicating station (#8) are set as a first frame period T1, station sync transmit/receive intervals for the communicating station (#10), the communicating station (#15), the communicating station (#18) and a communicating station (#19) being set as a second frame period T2, station sync transmit/receive intervals for a communicating station (#20), a communicating station (#23), a communicating station (#28) and a communicating station (#30) being set as a third frame period T3, station sync transmit/receive intervals for a communicating station (#36), a communicating station (#43), a communicating station (#50) and a communicating station (#54) being set as a fourth frame period T4, and thus transmitting station information 100 of the station synchronizing interval is transmitted as information of each communicating station in each frame using these intervals.

In this manner, arbitrary communicating stations can be designated in each frame using the station sync transmit/receive intervals.

Figure 11:
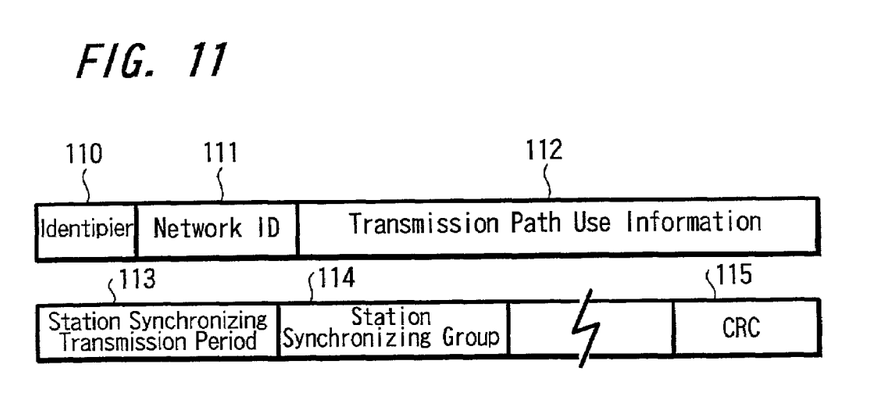
FIG. 11 is a diagram showing an example of the structure of down-link control information.

FIG. 11 is a diagram showing an example of the structure of down-link control information.

As illustrated, the down-link control information is comprised of identifier 110 representing down-link control information, a network ID 111 serving as an identification code used to identify the network concerned, transmission path use information 112 describing with respect to how to use the information transmitting field, transmission period information 113 of station sync transmit/receive interval, communicating station group information 114 transmitting during the station sync transmit/receive interval of this frame, and the like. Further, a CRC (Cyclic Redundancy Check) 115 for detecting errors is added to the down-link control information.

In addition, other information may be added to the down-link control information if necessary.

Figure 12:
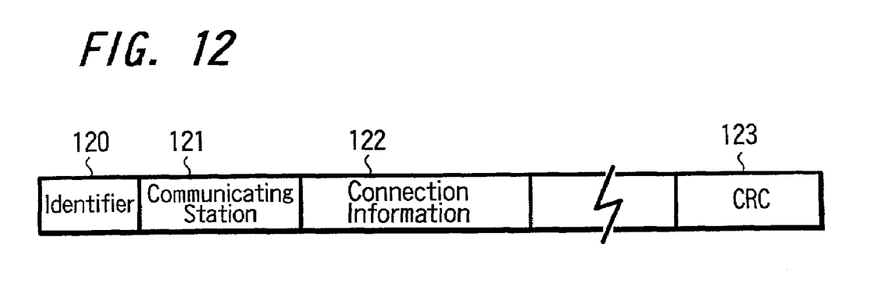
FIG. 12 is a diagram showing an example of the structure of station synchronizing information.

FIG. 12 is a diagram showing an example of the structure of station synchronizing information.

As illustrated, the station synchronizing information is comprised of identifier 120 for representing station synchronizing information, a communicating station ID serving as an identification code for identifying the communicating station concerned, connection link information 122 for representing the connection state with communicating stations existing around his own station, and the like. Further, a CRC 123 for detecting errors is added to this station synchronizing information.

Additionally, other information may be added to this station synchronizing information at need.

Figure 13:
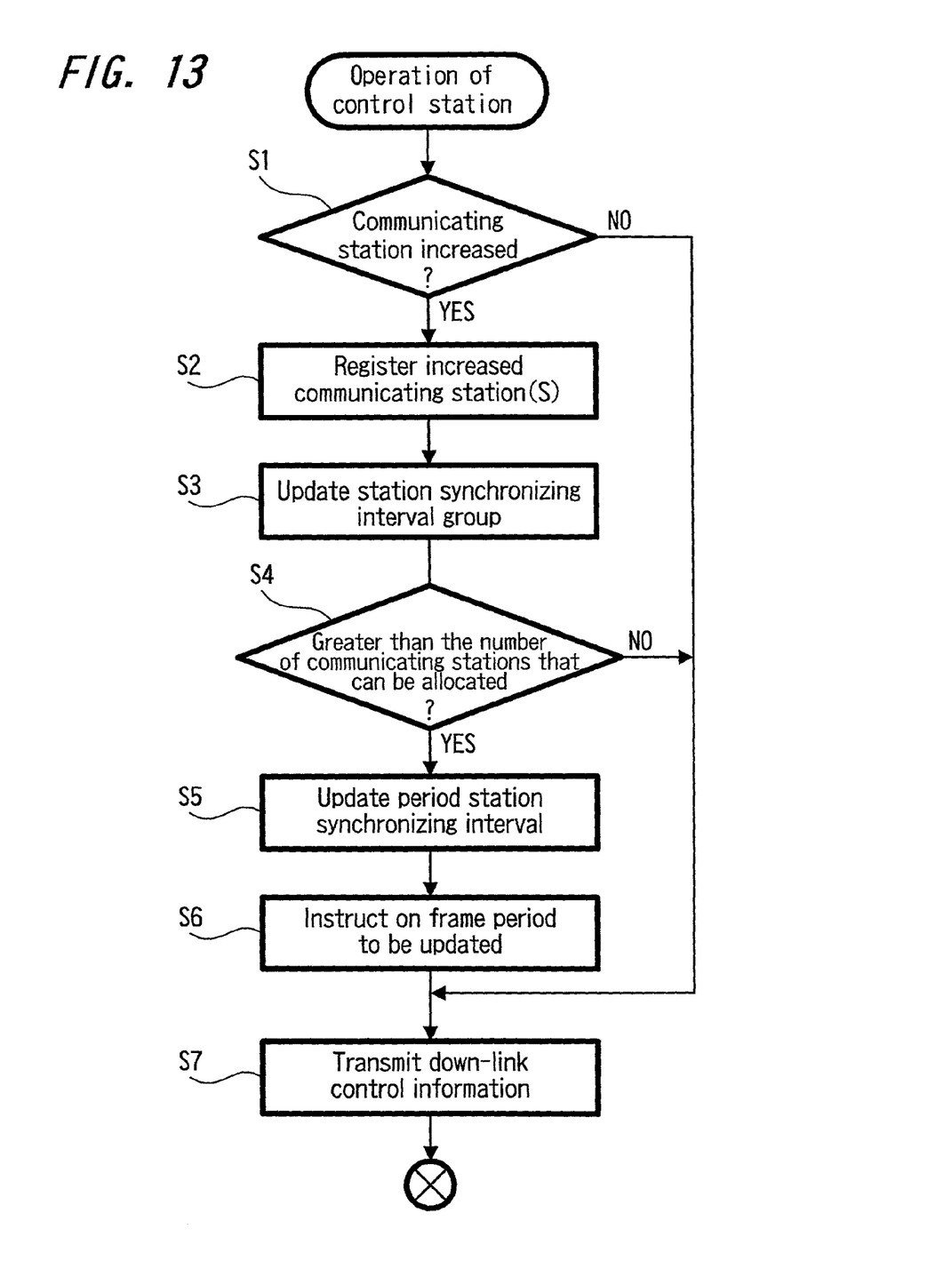
FIG. 13 is a flow chart showing operations of a radio transmission apparatus which serves as a control station.

FIG. 13 is a flow chart showing operation of the radio transmission apparatus which serves as the control station.

In FIG. 13, it is determined at a step S1 whether or not the communicating stations forming the network increases. If the communicating stations increases, then operation goes to a step S2 where the increased communicating stations are registered.

Further, at a step S3, additional information is added to group information of the station synchronizing interval to update the group and down-link information containing those information is created.

Then, it is determined at a step S4 whether or not the group exceeds the number of the stations that can be allocated in the station synchronizing interval.

If it is determined at the step S4 that the group exceeds the number of the stations that can be allocated in the station synchronizing interval, then the information transmitting period of the station synchronizing interval is updated at a step S5, and the frame period to be updated due to the updated information transmitting period is instructed at a step S6.

Thereafter, down-link control information containing those information is created, and the down-link control information is transmitted at a step S7 to end the processing.

If it is determined at the step S4 that the group does not exceed the number of the stations that can be allocated in the station synchronizing interval, then down-link control information is transmitted at the step S7 to end the processing.

If it is determined at the step S1 that the number of the communicating stations does not increase, then operation goes to the step S7, where the down-link control information is transmitted to end the processing.

Figure 14:
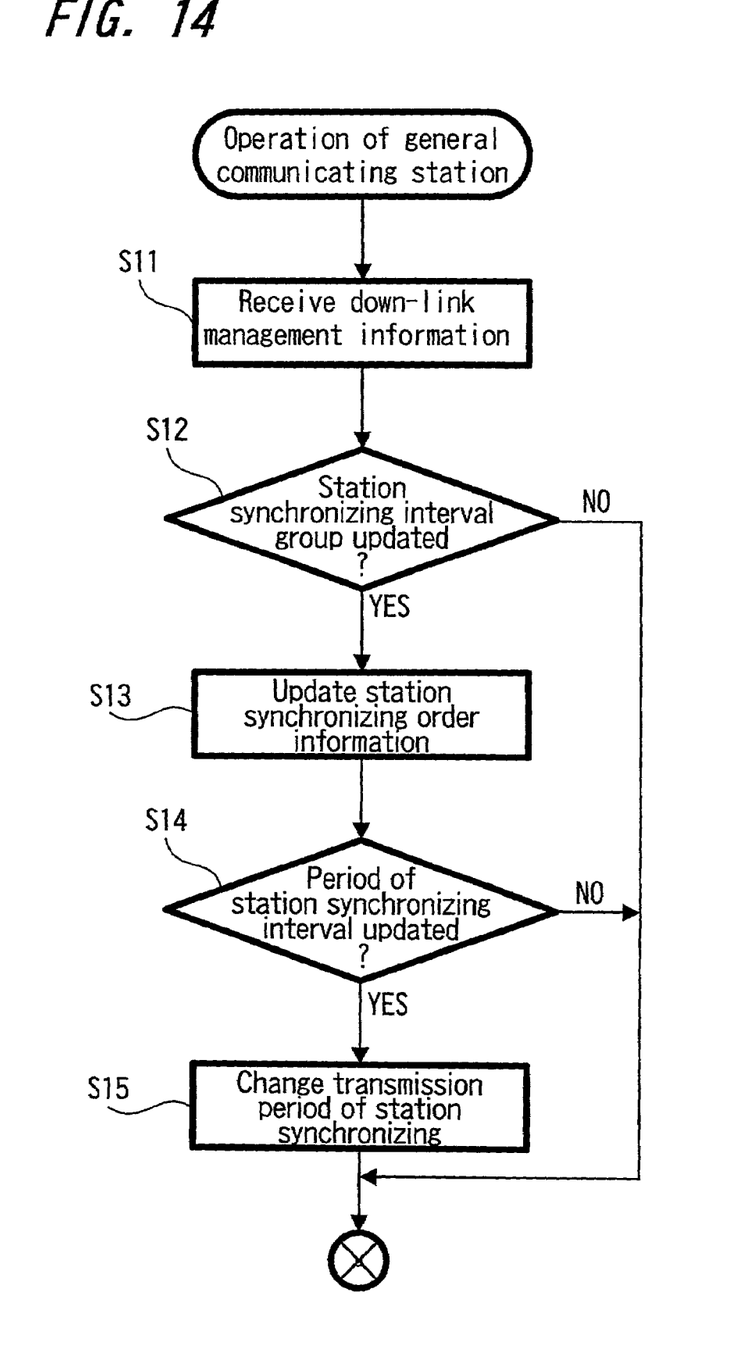
FIG. 14 is a flow chart showing operations of a radio transmission apparatus in a general communicating station.

FIG. 14 is a flow chart showing operations of a radio transmission apparatus which serves as a general communicating station.

As illustrated, at a step S11, down-link control information is received at a starting position of the frame.

It is determined at a step S12 whether or not station synchronizing interval group information contained in that information is updated.

If it is determined at the step S12 that the group information is not updated, then the processing ends at once in order to continue the conventional processing.

If it is determined at the step S12 that the group information is updated, then operation goes to a step S13, where station synchronizing order information is updated and also the station synchronizing intervals of the increased communicating stations are received.

Then, it is determined at a step S14 whether or not the information transmitting period of the station synchronizing interval is updated.

If it is determined at the step S14 that the information transmitting period is not updated, then processing ends at once in order to continue the conventional processing.

If it is determined at the step S14 that the information transmitting period is updated, then operation goes top a step S15, where the frame period which updates the information transmitting period is changed to end processing.

Figure 15:
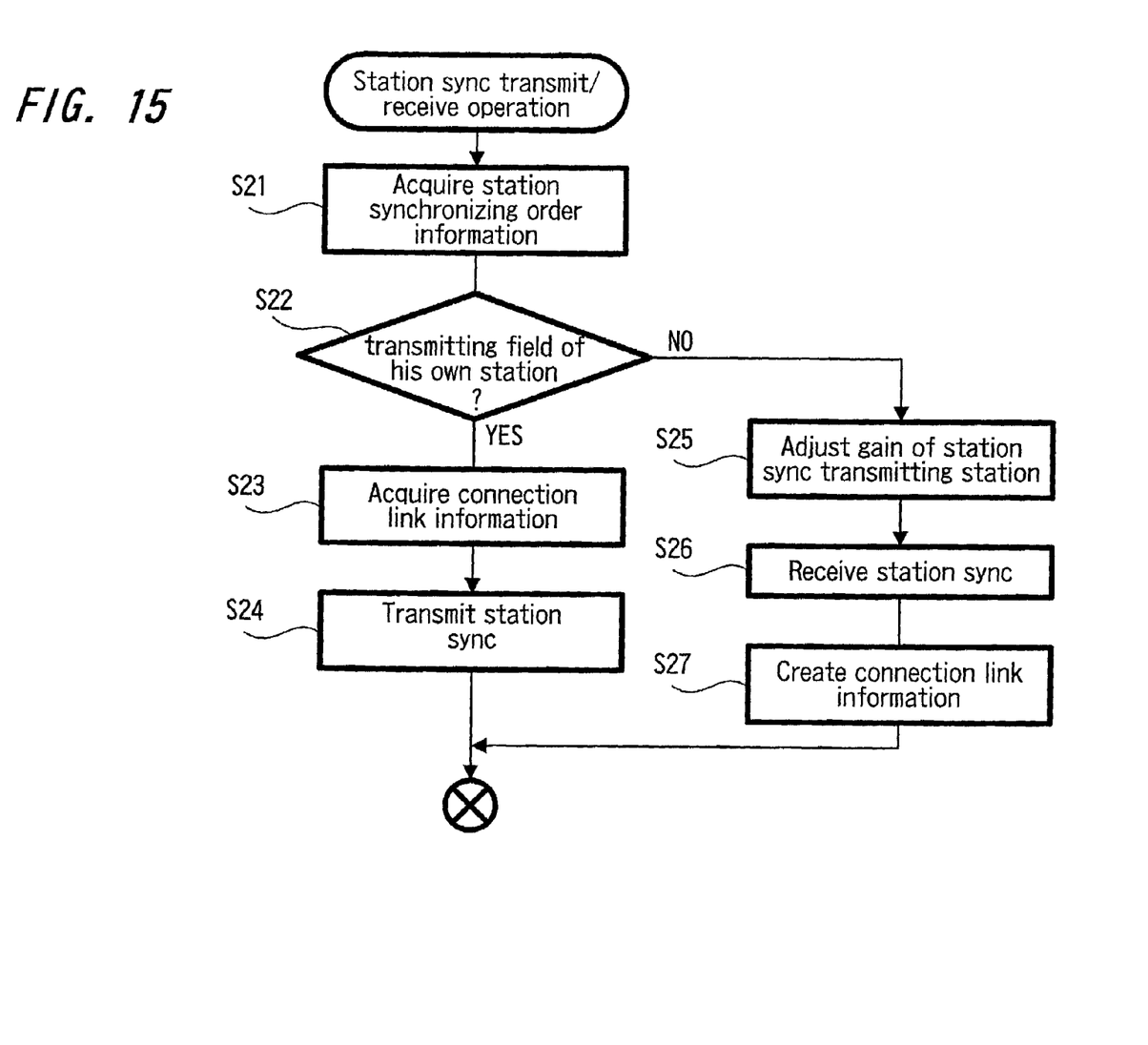
FIG. 15 is a flow chart showing operations of transmitting and receiving station synchronizing information in each radio transmission apparatus during a station sync interval.

FIG. 15 is a flow chart showing operations of each radio transmission apparatus in the station sync transmit/receive interval.

As illustrated, at a step S21, the station synchronizing order information which is set at the above step S14 of FIG. 14 is acquired.

Then, it is determined at a step S22 whether or not the station synchronizing interval is one in which his own station transmits.

If it is determined at the step S22 that the station synchronizing interval is not the one in which his own station transmits, then operation goes to a step S25, where the gain of a communicating station which transmits a station sync is adjusted. Then, the station sync from that communicating station is received at a step S26, and station synchronizing information is acquired at a step S27 for creating connection link information.

By acquiring information on all communicating stations over the station sync transmitting period, it is possible to specify the communicating stations existing around his own station from the connection link information.

If it is determined at the step S22 that the station synchronizing interval is the one in which his its own station transmits, then operation goes to the step S23, where the connection link information is acquired. Then, at the step S24, the station synchronizing information is transmitted, thereby making it possible to execute processing of the periodical station sync transmit/receive interval.

While the above embodiment of the present invention is an example applied to the wireless 1394 format, needless to say, the present invention is not limited thereto and can also be applied to other radio networks.

According to the radio transmission method of the present invention, since the predetermined frame is prescribed, the management information transmitting field being provided within the frame period, the station sync transmit/receive interval being provided within the management information transmitting field and the arbitrary communicating station being designated to transmit the station synchronizing signal at intervals of a plurality of frame periods during the station sync transmit/receive interval, even if only the station sync transmitting area corresponding to the number which is less than the number of the communicating stations forming the network exist within one frame, there may be achieved the effect that the station sync (synchronizing signal) can be transmitted and received.

According to the radio transmission method of the present invention, since, in the above radio transmission method, the down-link control information is provided within the management information transmitting field and the control station designates in advance based on the down-link control information the communicating station which transmits the station sync in the frame period, there may be achieved the effect that the communicating station can avoid conflicting with other communicating station and can transmit and receive the station sync. Moreover, since the communicating station which transmits the station sync in advance can be specified, there may be achieved the effect that the communicating station which receives the station sync can adjust the gain in advance.

According to the radio transmission method of the present invention, since, in the above radio transmission method, the frame period in which the station sync is transmitted is changed depending on the number of the communicating stations forming the network, if there are a few communicating stations forming the network, then the transmission frame period can be reduced and so the useless station sync transmitting area can be reduced as much as possible. If the communicating stations forming the network increase, then the transmission frame period can be set to be long, thus allowing the information of the station sync to be transmitted satisfactorily. Furthermore, all communicating station information can advantageously be obtained in a short period of time.

According to the radio transmission method of the present invention, since, in the above radio transmission method, the down-link control information is provided within the management information transmitting field to specify in advance the period information required when the station sync is transmitted as well as the group of the communicating stations which transmits the station sync in the frame period, there may be achieved the effect that the station sync transmitting area can easily be specified among all communicating stations on the network.

According to the radio transmission apparatus of the present invention, since the specific communicating station for transmitting information during the station sync transmit/receive interval is designated by the simple structure when the down-link control information is transmitted, there may be achieved the effect that it is possible to provide the radio transmission apparatus for the control station which can perform a highly-efficient radio transmission depending on the number of the communicating stations.

According to the radio transmission apparatus of the present invention, since the down-link management information which designates the communicating station transmitting at the designated position within the management information transmitting field is received, information being transmitted and received based on the designation of the down-link management information during the station sync transmit/receive interval, there may be achieved the effect that it is possible to realize the radio transmission apparatus for the terminal station which can perform a highly-efficient transmission depending on the number of the communicating stations.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A radio transmission method in which a plurality of transmission apparatuses form a network to transmit information, comprising the steps of:
   prescribing a predetermined frame period;
   providing a management information transmitting field in said frame period;
   providing a station sync transmit/receive interval and a down-link control interval in said management information transmitting field; and
   designating a communicating station to transmit a station synchronizing signal at a plurality of frame period intervals during said station sync transmit/receive interval, wherein
   a virtual frame period, formed of a plurality of contiguous frame periods in which said station synchronizing signal is transmitted, is updated depending on a number of communicating stations forming said network, and down-link control information including said updated virtual frame period is transmitted using said down-link control interval.

2. The radio transmission method according to claim 1, wherein for designating said communicating station to transmit during said station sync transmit/receive interval, said down-link control information is provided within said management information transmitting field and a control station designates said communicating station for transmitting information in said frame period based on said down-link control information.

3. The radio transmission method according to claim 1, wherein for designating said communicating station that transmits in said frame period during said station sync transmit/receive interval, said down-link control information is provided within said management information transmitting field and information regarding a period for transmitting said station synchronizing signal and a group of communicating stations for transmitting said station synchronizing signal are specified.

4. A radio transmission apparatus that serves as a control station of a network when a plurality of transmission apparatuses form said network to transmit information among a plurality of communicating stations, said radio transmission apparatus comprising:
   communication processing means for transmitting and receiving a radio signal;
   station synchronizing setting means for transmitting a synchronizing signal that determines a frame period using said communication processing means, for designating a management information transmitting field within said frame period and setting a station sync transmit/receive interval during which said communicating stations forming said network transmit and receive information within said management information transmitting field;
   down-link control information transmitting means for transmitting down-link control information in a down-link control interval for notifying a specific communicating station transmitting during said station sync transmit/receive interval; and
   virtual frame period setting means for setting and updating a virtual frame period, formed of a plurality of contiguous frame periods in which said synchronizing signal is transmitted, depending on a number of communicating stations forming said network, and for including said updated virtual frame period in said down-link control information for transmission using said down-link control interval.

5. A radio transmission apparatus for communicating information among a plurality of communicating stations in a network formed by a plurality of transmission apparatuses, said radio transmission apparatus comprising:
   communication processing means for transmitting and receiving a radio signal;
   frame period determining means for receiving a synchronizing signal determining a frame period using said communication processing means and determining said frame period, and for setting a virtual frame period, formed of a plurality of contiguous frame periods, according to down-link control information received by said communication processing means;
   management field specifying means for specifying a management information transmitting field within said frame period;
   down-link management information receiving means for designating one communicating station of said plurality of communicating stations from which information is transmitted at a designated position within said management information transmitting field;

transmitting and receiving means for transmitting and receiving information based on said designation of said down-link management information;

the virtual frame period being updated depending on the number of communicating stations forming the network.

* * * * *